(12) United States Patent
Park et al.

(10) Patent No.: US 11,361,581 B2
(45) Date of Patent: Jun. 14, 2022

(54) OPTICAL SENSOR, ELECTRONIC APPARATUS INCLUDING THE SAME AND MANUFACTURING METHOD THEREOF

(71) Applicant: Samsung Display Co., Ltd., Yongin-si (KR)

(72) Inventors: SangJin Park, Yongin-si (KR); Cha-Dong Kim, Seoul (KR); Heena Kim, Hwaseong-si (KR); Inkyung Yoo, Hwaseong-si (KR); SungBae Ju, Hwaseong-si (KR); Taehyeok Choi, Seoul (KR)

(73) Assignee: Samsung Display Co., Ltd., Yongin-si (KR)

( * ) Notice: Subject to any disclaimer, the term of this patent is extended or adjusted under 35 U.S.C. 154(b) by 120 days.

(21) Appl. No.: 16/999,672

(22) Filed: Aug. 21, 2020

(65) Prior Publication Data

US 2021/0150177 A1  May 20, 2021

(30) Foreign Application Priority Data

Nov. 18, 2019 (KR) ........................ 10-2019-0147994

(51) Int. Cl.
*G06V 40/13* (2022.01)
*H04M 1/02* (2006.01)

(52) U.S. Cl.
CPC ...... *G06V 40/1318* (2022.01); *H04M 1/0266* (2013.01)

(58) Field of Classification Search
CPC ........ G06K 9/00006–0012; G06K 2009/0006; G06V 40/12–1394; G06V 10/10–19; H01L 21/02532; H01L 21/02592; H01L 21/265; H01L 21/32055

See application file for complete search history.

(56) References Cited

U.S. PATENT DOCUMENTS

| | | | |
|---|---|---|---|
| 5,796,118 A * | 8/1998 | Morikawa | H01L 31/035254 257/19 |
| 6,448,614 B2 | 9/2002 | Kubo et al. | |
| 10,510,910 B2 | 12/2019 | Wu et al. | |

(Continued)

FOREIGN PATENT DOCUMENTS

| KR | 10-0244046 B1 | 2/2000 |
|---|---|---|
| KR | 10-2006-0122257 A | 11/2006 |
| KR | 10-2019-0054881 A | 5/2019 |

*Primary Examiner* — Patrick F Marinelli
(74) *Attorney, Agent, or Firm* — Lewis Roca Rothgerber Christie LLP

(57) ABSTRACT

An optical sensor includes: a sensing unit including a first sensing electrode, a second sensing electrode spaced apart from the first sensing electrode, and a sensing layer between the first sensing electrode and the second sensing electrode, the sensing layer containing amorphous silicon and germanium (Ge) ions impregnated in the amorphous silicon; and an optical pattern unit on the sensing unit and including a light shielding pattern and a plurality of transmission patterns in the light shielding pattern, wherein the sensing layer includes a first region, a second region, and a third region sequentially arranged from a boundary between the second sensing electrode and the sensing layer toward the first electrode, and a concentration of the germanium (Ge) ions in the amorphous silicon is relatively higher in the second region than in the first region and the third region.

17 Claims, 13 Drawing Sheets

(56) References Cited

U.S. PATENT DOCUMENTS

| | | | |
|---|---|---|---|
| 10,861,988 B2* | 12/2020 | Wu | H01L 27/1462 |
| 10,861,989 B2* | 12/2020 | Wu | H01L 31/1804 |
| 2018/0085792 A1 | 3/2018 | Safai et al. | |
| 2020/0083389 A1* | 3/2020 | Wu | H01L 31/02327 |
| 2020/0083390 A1* | 3/2020 | Wu | H01L 31/109 |
| 2021/0150177 A1* | 5/2021 | Park | H04M 1/026 |
| 2021/0334502 A1* | 10/2021 | Lee | G06K 9/0004 |
| 2021/0350100 A1* | 11/2021 | Park | G06K 9/0002 |
| 2021/0357612 A1* | 11/2021 | Yang | G02B 6/4298 |
| 2021/0357613 A1* | 11/2021 | Lim | G06K 9/0004 |

* cited by examiner

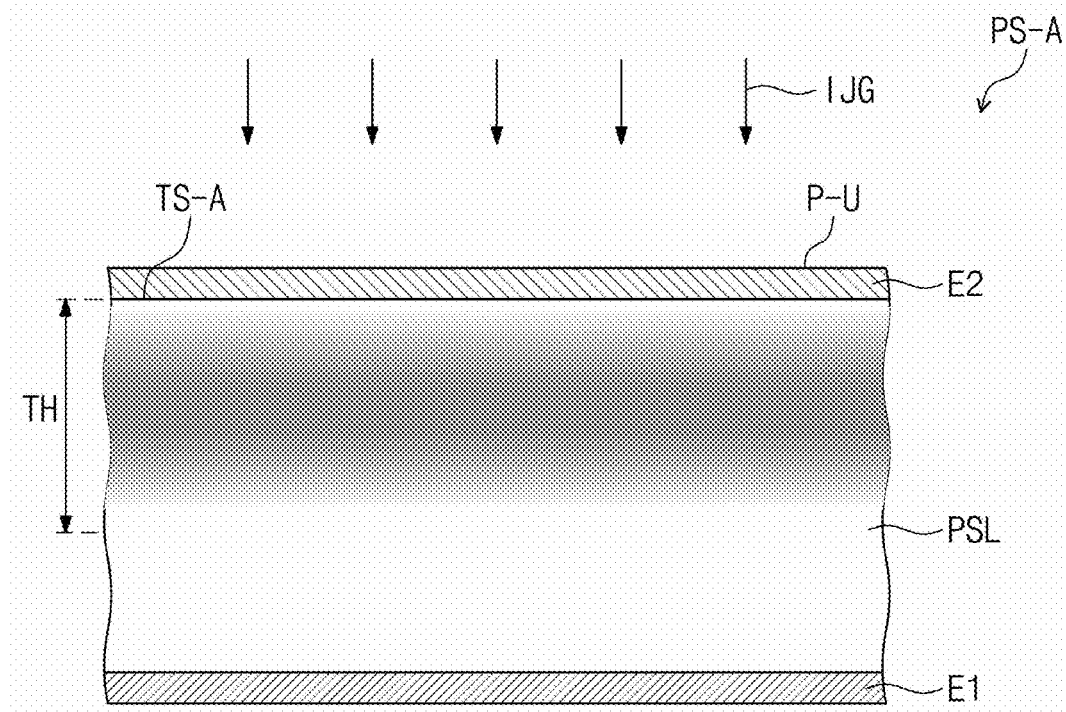

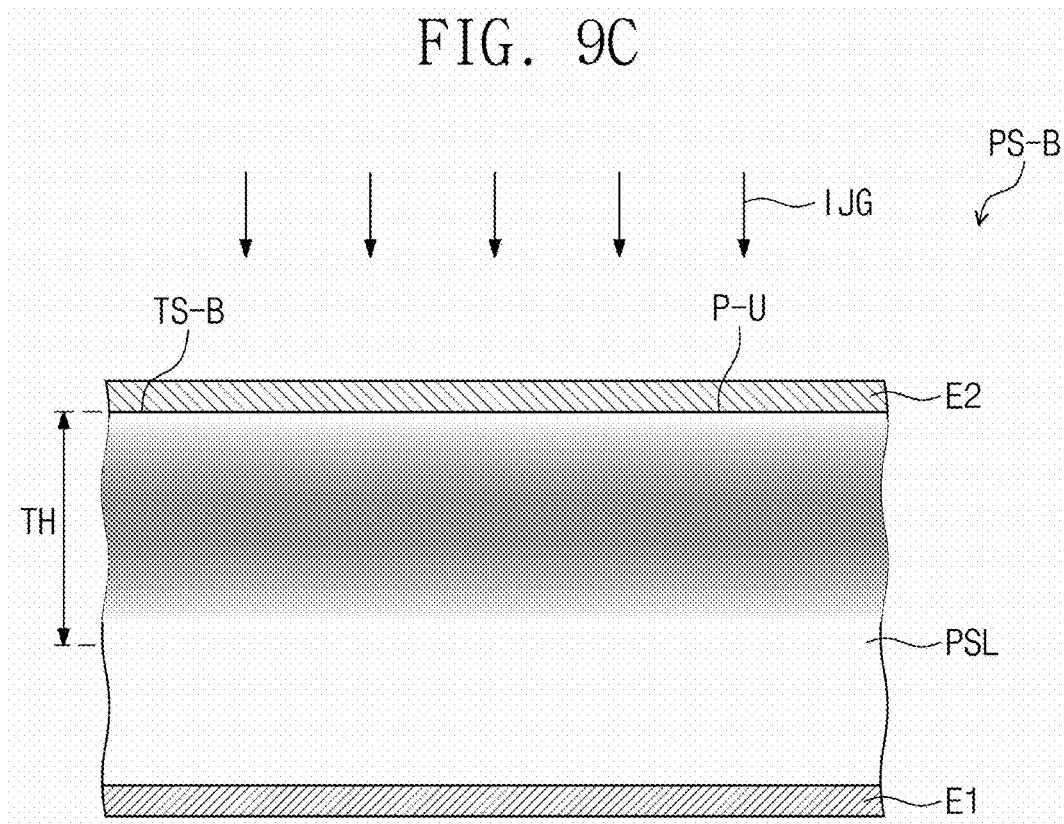

OPTICAL SENSOR, ELECTRONIC APPARATUS INCLUDING THE SAME AND MANUFACTURING METHOD THEREOF

CROSS-REFERENCE TO RELATED APPLICATION

The present application claims priority to and the benefit of Korean Patent Application No. 10-2019-0147994, filed on Nov. 18, 2019, the entire content of which is hereby incorporated by reference.

BACKGROUND

Aspects of some example embodiments of the present disclosure herein relate to an electronic apparatus including an optical sensor having a fingerprint recognition function and a manufacturing method thereof.

Electronic apparatuses provide various functions capable of organically communicating with a user, for example, by displaying images to provide information to the user or sensing an input (e.g., a touch input) of the user. Recent electronic apparatuses include a function for sensing a fingerprint of the user.

Examples of fingerprint recognition methods include a capacitive method for sensing a change in capacitance formed between electrodes, an optical method for sensing incident light by using an optical sensor, an ultrasonic method for sensing vibration by using a piezoelectric material. In recent display devices, a sensing unit for recognizing the fingerprint may be located on the back surface of a display panel.

The above information disclosed in this Background section is only for enhancement of understanding of the background and therefore the information discussed in this Background section does not necessarily constitute prior art.

SUMMARY

Aspects of some example embodiments of the present disclosure include an electronic apparatus including an optical sensor with relatively improved fingerprint recognition sensitivity.

According to some example embodiments of the inventive concept, an optical sensor includes: a sensing unit including a first sensing electrode, a second sensing electrode spaced apart from the first sensing electrode, and a sensing layer between the first sensing electrode and the second sensing electrode and containing amorphous silicon and germanium (Ge) ions impregnated in the amorphous silicon, and an optical pattern unit on the sensing unit and including a light shielding pattern and a plurality of transmission patterns in the light shielding pattern, wherein the sensing layer includes a first region, a second region and a third region sequentially arranged from a boundary between the second sensing electrode and the sensing layer toward the first electrode, and a concentration of the Ge ions in the amorphous silicon is relatively higher in the second region than in the first region and the third region.

According to some example embodiments, a thickness from the first region to the third region may be about 10 Å to about 9,000 Å.

According to some example embodiments, the sensing layer may include an impregnation region including the first to third regions and a non-impregnation region adjacent to the impregnation region and not impregnated with Ge ions, and a sum of thicknesses of the impregnation region and the non-impregnation region may be about 10,000 Å or less.

According to some example embodiments, the second region may have a relatively lower band-gap energy than the first region and the third region.

According to some example embodiments, the first region may absorb light of a relatively shorter wavelength band than the second region and the third region.

According to some example embodiments, the concentration of the Ge ions may have a Gaussian distribution in the first to third regions.

According to some example embodiments, the transmission patterns may be arranged to be spaced apart from each other on a plane in a direction crossing each other and are surrounded by the light shielding pattern.

According to some example embodiments, the first sensing electrode and the second sensing electrode may include amorphous silicon.

According to some example embodiments of the inventive concept, an electronic apparatus includes a display panel including an active region and a peripheral region adjacent to the active region and an optical sensor on a back surface of the display panel and overlap the active region, wherein the optical sensor includes a sensing layer including a first sensing electrode, a second sensing electrode spaced apart from the first sensing electrode, and the sensing layer between the first sensing electrode and the second sensing electrode and containing amorphous silicon and Ge ions impregnated in the amorphous silicon, and a concentration of the Ge ions in the amorphous silicon varies from the second sensing electrode to the first electrode.

According to some example embodiments, the sensing layer may include a first region, a second region and a third region sequentially arranged from a boundary between the second sensing electrode and the sensing layer toward the first electrode, and the concentration of the Ge ions in the amorphous silicon may be relatively higher in the second region than in the first region and the third region.

According to some example embodiments, a thickness from the first region to the third region may be about 10 Å to about 9,000 Å.

According to some example embodiments, the sensing layer may include an impregnation region including the first to third regions and a non-impregnation region adjacent to the impregnation region and not impregnated with Ge ions, and a sum of thicknesses of the impregnation region and the non-impregnation region is about 10,000 Å or less.

According to some example embodiments, the second region may have a relatively lower band-gap energy than the first region and the third region.

According to some example embodiments, the first region may absorb light of a relatively shorter wavelength band than the second region and the third region.

According to some example embodiments, the first sensing electrode and the second sensing electrode may include amorphous silicon.

According to some example embodiments, the optical sensor may further include an optical pattern unit on the second sensing electrode and including a light shielding pattern and a plurality of transmission patterns in the light shielding pattern.

According to some example embodiments, the electronic apparatus may further include a lower panel between the display panel and the optical sensor and having an opening defined for accommodating the optical sensor, wherein the lower panel may include any one of a cushion layer, a heat dissipation layer and a light shielding layer.

According to some example embodiments of the inventive concept, a method of manufacturing an electronic apparatus includes providing a first sensing electrode on a work substrate and including amorphous silicon and an initial sensing layer on the first sensing electrode and including amorphous silicon, forming, on the initial sensing layer, a second sensing electrode including amorphous silicon, and forming a sensing layer by implanting Ge ions into the initial sensing layer through an ion implantation method, in which a thickness of the Ge ions implanted in a direction from a boundary between the second sensing electrode and the sensing layer toward the first electrode is about 10 Å to about 9,000 Å.

According to some example embodiments, the forming of the second sensing electrode may include forming the second sensing electrode in the initial sensing layer by implanting phosphorus (P) ions into an upper surface of the initial sensing layer through the ion implantation method.

According to some example embodiments, the forming of the second sensing electrode may include forming the second sensing electrode by depositing phosphorus (P) ions onto an upper surface of the initial sensing layer.

BRIEF DESCRIPTION OF THE DRAWINGS

The accompanying drawings are included to provide a further understanding of the inventive concept, and are incorporated in and constitute a part of this specification. The drawings illustrate further details of some example embodiments of the inventive concept and, together with the description, serve to explain principles of the inventive concept. In the drawings:

FIGS. 8A to 8C are sectional views showing a method of manufacturing an electronic apparatus according to some example embodiments; and FIGS. 9A to 9C are sectional views showing a method of manufacturing an electronic apparatus according to some example embodiments.

DETAILED DESCRIPTION

Figure 1A:
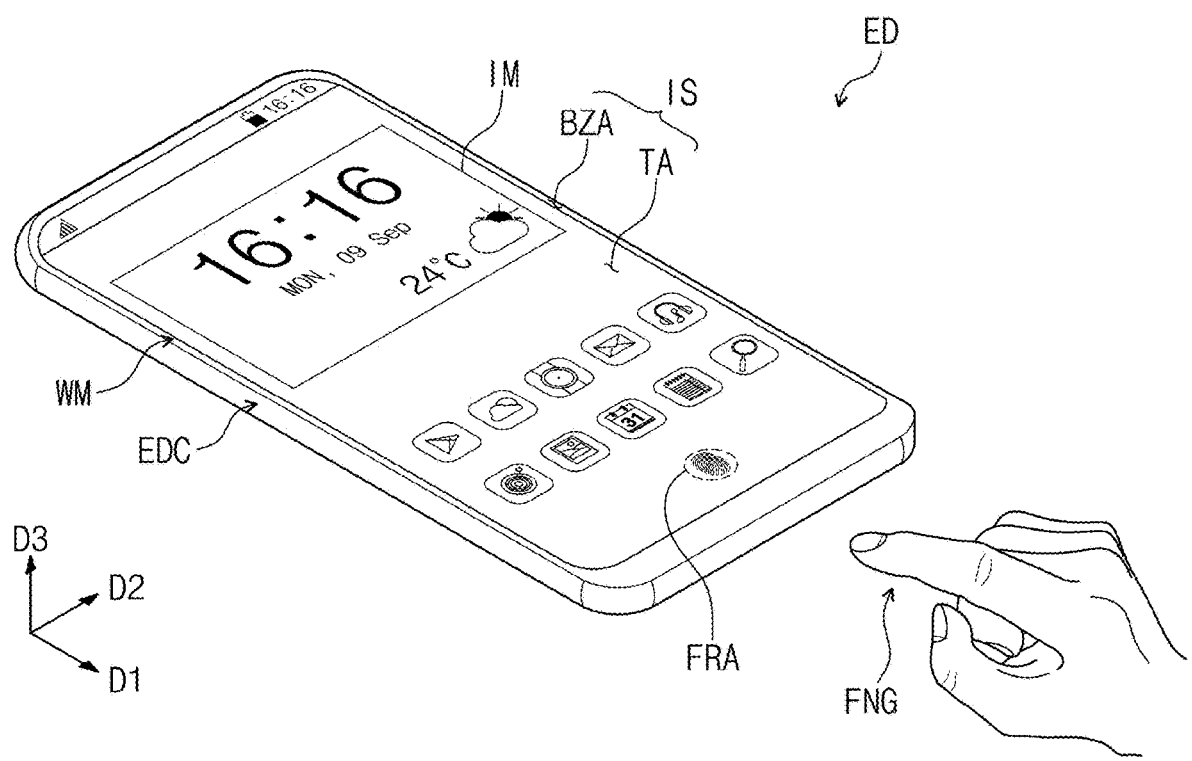
FIG. 1A is a combined perspective view of an electronic apparatus according to some example embodiments.

In the present specification, it will be understood that when an element (or region, layer, part, or the like) is referred to as being "on", "connected to" or "coupled to" another element, it can be directly on, connected or coupled to the other element or intervening elements may be present.

Like numbers refer to like elements throughout. In the drawings, the thicknesses, the ratios and the dimensions of the elements are exaggerated for effective description of the technical contents.

As used herein, the term "and/or" includes any and all combinations of one or more of the associated listed items.

It will be understood that, although the terms first, second, etc. may be used herein to describe various elements, these elements should not be limited by these terms. These terms are only used to distinguish one element from another element. For example, without departing from the teachings of the present invention, a first element could be termed a second element, and similarly, a second element could be termed a first element. The singular forms, "a", "an" and "the" are intended to include the plural forms as well, unless the context clearly indicates otherwise.

Terms, such as "beneath", "below", "lower", "above", "upper" and the like, may be used herein for ease of description to describe one element or feature's relationship to another element(s) or feature(s) as illustrated in the figures. It will be understood that the terms are spatially relative terms and are to be described with reference to the orientation depicted in the figures.

Unless otherwise defined, all terms (including technical and scientific terms) used herein have the same meaning as commonly understood by one of ordinary skill in the art to which this invention belongs. It will be further understood that terms, such as those defined in commonly used dictionaries, should be interpreted as having a meaning that is consistent with their meaning in the context of the relevant art and will not be interpreted in an idealized or overly formal sense unless expressly so defined herein.

It will be further understood that the terms "includes" and/or "including", when used in this specification, specify the presence of stated features, integers, steps, operations, elements, and/or components, but do not preclude the presence or addition of one or more other features, integers, steps, operations, elements, components, and/or groups thereof.

Hereinafter, aspects of some example embodiments of the inventive concept will be described in more detail with reference to the accompanying drawings.

Figure 1B:
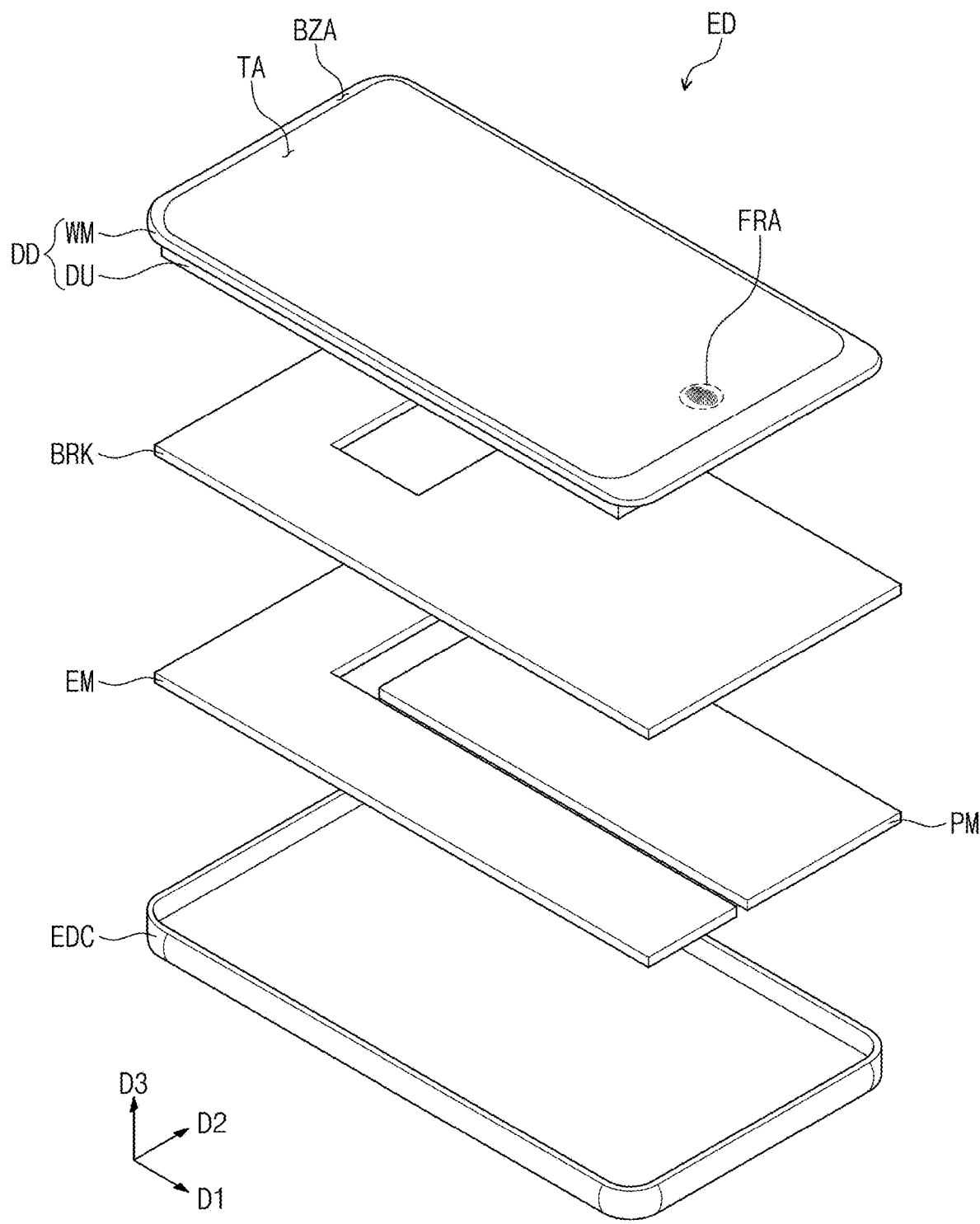
FIG. 1B is an exploded perspective view of the electronic apparatus shown in FIG. 1A.
Figure 2:
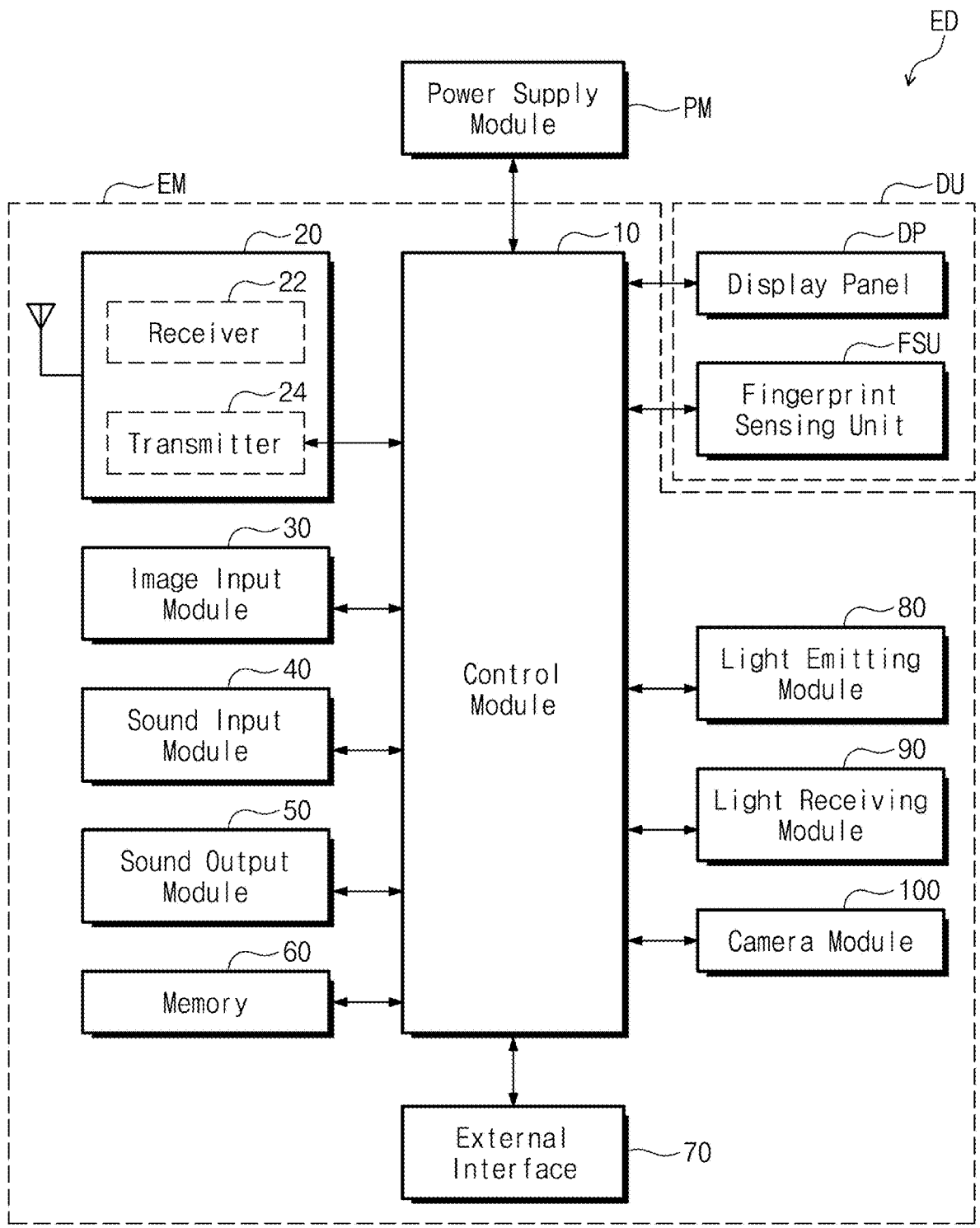
FIG. 2 is a block diagram of the electronic apparatus shown in FIG. 1A.

FIG. 1A is a combined perspective view of an electronic apparatus according to some example embodiments. FIG. 1B is an exploded perspective view of the electronic apparatus shown in FIG. 1A. FIG. 2 is a block diagram of the electronic apparatus shown in FIG. 1A.

An electronic apparatus ED may be an apparatus that is activated according to an electrical signal. The electronic apparatus ED may be implemented by various embodiments. Examples of the electronic apparatus ED may include a tablet, a laptop, a computer, a smart television, and the like. In FIGS. 1A and 1B, a smartphone is shown as an example of the electronic apparatus ED, but embodiments according to the present disclosure are not limited thereto.

The electronic apparatus ED may display an image IM toward a third direction D3 on a display surface IS that is parallel to plane defined by a first direction D1 and a second direction D2. The third direction D3 may be a direction that is perpendicular or normal to the plane of the display surface IS. The display surface IS on which the image IM is displayed may correspond to the front surface of the electronic apparatus ED. The image IM may include a moving image as well as a still image. In FIG. 1A, an internet search box is shown as an example of the image IM.

In the present embodiment, the front surface (or top surface) and the back surface (or bottom surface) of each of the members are defined on the basis of the direction in which the image IM is displayed. The front surface and the back surface are opposed to each other in the third direction D3, and the respective normal directions of the front surface and the rear surface may be parallel to the third direction D3.

The separation distance between the front surface and the back surface in the third direction D3 may correspond to the thickness or height of the electronic apparatus ED in the third direction D3. Meanwhile, the directions indicated by the first to third directions D1, D2, and D3 are relative concepts and may thus be converted to other directions. Hereinafter, the first to third directions are directions indicated by the first to third directions D1, D2, and D3, respectively and refer to the same reference numerals.

The front surface IS of the electronic apparatus ED may be divided into a transmission region TA and a bezel region BZA. The transmission region TA may be a region in which the image IM is displayed. A user visually recognizes the image IM through the transmission region TA. In FIG. 1A, the transmission region TA is shown in a square shape with vertices or corners being rounded. However, this is only illustrative, and the transmission region TA may have various shapes and is not limited to any one embodiment or shape.

The bezel region BZA is adjacent to the transmission region TA. The bezel region BZA may have a color (e.g., a set or predetermined color). The bezel region BZA may surround the transmission region TA. Accordingly, the shape of the transmission region TA may be substantially defined by the bezel region BZA. However, this is only illustrative, and the bezel region BZA may be arranged adjacent to only one side of the transmission region TA, or may be omitted. The electronic apparatus according to some example embodiments of the inventive concept may include various embodiments and is not limited to any one embodiment.

The electronic apparatus ED may sense a fingerprint FNG of the user applied from the outside. Accordingly, the electronic apparatus ED may provide a fingerprint sensing region FRA on the display surface IS. In FIG. 1A, the fingerprint sensing region FRA is shown as being provided in the transmission region TA in which the image IM is displayed. However, this is only illustrative, and the fingerprint sensing region FRA may be provided in the bezel region BZA, may be provided in the entire transmission region TA, or may be provided in the entire display surface IS. The electronic apparatus ED may sense the fingerprint FNG of the user provided in the fingerprint sensing region FRA.

The fingerprint FNG of the user may include a surface state of the user's hand, for example, surface uniformity or surface waviness shape. However, this is only illustrative, and when the input of any intangible thing is provided to the electronic apparatus ED, the electronic apparatus ED may sense information on the surface of the intangible thing.

Referring to FIG. 1B and FIG. 2, the electronic apparatus ED may include a display module DD, an electronic module EM, a power supply module PM, a bracket BRK, and an outer case EDC. FIG. 1B is a simplified view of components of the electronic apparatus ED, and embodiments according to the present disclosure are not limited thereto. According to some example embodiments, the electronic apparatus ED may include additional components or fewer components without departing from the spirit and scope of embodiments according to the present disclosure.

The display module DD includes a window WM and a display unit DU. As shown in FIG. 1A, in the combined state, the window WM constitutes the appearance of the electronic apparatus ED. The window WM may be a component for protecting internal components of the electronic apparatus ED from external shock and substantially providing the display surface IS of the electronic apparatus ED.

The display unit DU is located on the back surface of the window WM (e.g., on a side of the window WM that is internal with respect to the electronic apparatus ED). The display unit DU may include a display panel DP and an optical sensor FSU (see FIG. 3A). The display panel DP may be a component for substantially generating the image IM. The image IM generated by the display panel DP is displayed on the display surface IS through the transmission region TA and is visually recognized or perceived from the outside by the user.

The optical sensor FSU may sense the fingerprint FNG of the user applied from the outside. As described above, the optical sensor FSU may sense the fingerprint FNG of the user (hereinafter, including surface information on any intangible thing) provided in the fingerprint sensing region FRA.

Figure 3A:
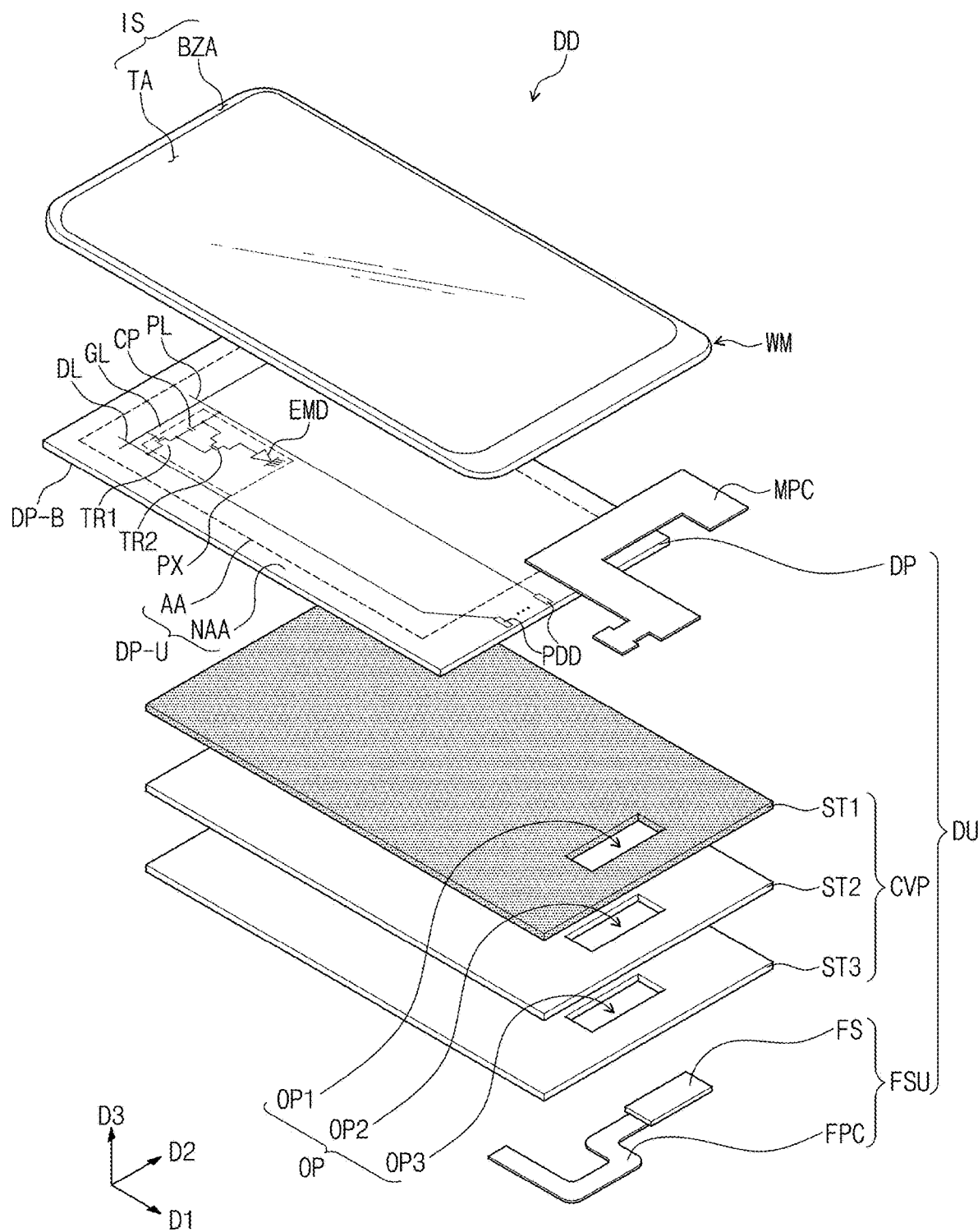
FIG. 3A is an exploded perspective view showing some of the components shown in FIG. 2.

The display unit DU may be electrically connected to the electronic module EM through a main circuit board FPC (see FIG. 3A). The display unit DU may receive the information on the image IM to be displayed through the electronic module EM, or provide, to the electronic module EM, information on the sensed fingerprint FNG of the user and provide, to the user, information which is processed on the basis of the provided information.

The power supply module PM supplies power required for the overall operation of the electronic apparatus ED. The power supply module PM may include a general battery module.

The bracket BRK is coupled with the display module DD and/or the outer case EDC to divide the internal space of the electronic apparatus ED. The bracket BRK provides a space in which other components may be positioned or arranged. In addition, the bracket BRK may support the display module DD such that the display module DD is fixed without shaking. A coupling groove corresponding to the shape of the electronic module EM may be defined in the bracket BRK such that the electronic module EM is fixed. The bracket BRK includes a metal or plastic member. Although one bracket BRK is shown by way of example, the electronic apparatus ED may include a plurality of brackets BRK.

The outer case EDC may be coupled to the bracket BRK and/or the display module DD. According to some example embodiments, the outer case EDC and the window WM may form the appearance of the electronic apparatus ED together. According to some example embodiments, the outer case EDC made as a single body is shown by way of example, but the outer case EDC may include a plurality of bodies assembled to each other. The outer case EDC may include a plurality of frames and/or plates made of glass, plastic, or metal.

The electronic module EM is mounted on a motherboard and has various functional modules for operating the electronic apparatus ED. The motherboard may be electrically connected to the main circuit board FPC (see FIG. 3A) of the display unit DU through a connector. Here, the motherboard may include a rigid type printed circuit board.

Referring to FIG. 2, the electronic module EM may include a control module 10, a wireless communication module 20, an image input module 30, a sound input module 40, a sound output module 50, a memory 60, an external interface 70, a light emitting module 80, a light receiving module 90, a camera module 100, and the like. Some of the modules may not be mounted on the motherboard, but may be electrically connected to the motherboard through a flexible circuit board.

The control module 10 controls the overall operation of the electronic apparatus ED. The control module 10 may be a microprocessor. For example, the control module 10 activates or deactivates the display module DD. The control module 10 may control the image input module 30, the sound input module 40, the sound output module 50, and the like, on the basis of the touch signal received from the display module DD.

The wireless communication module 20 may transmit and receive wireless signals to and from other terminals using a Bluetooth or Wi-Fi line. The wireless communication module 20 may transmit and receive a voice signal using a general communication line. The wireless communication module 20 includes a transmitter 22 for modulating and transmitting a signal to be transmitted, and a receiver 24 for demodulating a received signal.

The image input module 30 processes an image signal and converts the image signal into image data to be displayable on the display module DD. The sound input module 40 receives an external sound signal by a microphone in a recording mode, a voice recognition mode, and the like, and converts the external sound signal into electrical voice data. The sound output module 50 converts the sound data received from the wireless communication module 20 or the sound data stored in the memory 60 into sounds and outputs the converted sounds to the outside.

The external interface 70 serves as an interface connected to an external charger, a wired/wireless data port, a card socket (for example, a memory card, a SIM/UIM card), or the like.

The light emitting module 80 generates and outputs light. The light emitting module 80 may output infrared rays. The light emitting module 80 may include a light emitting diode (LED) element. The light receiving module 90 may sense infrared rays. The light receiving module 90 may be activated when an infrared ray of a level (e.g., a set or predetermined level) or more is sensed. The light receiving module 90 may include a complementary metal-oxide-semiconductor (CMOS) sensor. After the infrared rays generated by the light emitting module 80 is output, the infrared is reflected by an external object (for example, a user's finger or face), and the reflected infrared ray may be incident on the light receiving module 90. The camera module 100 captures an external image (e.g., an image of an external object).

Figure 3B:
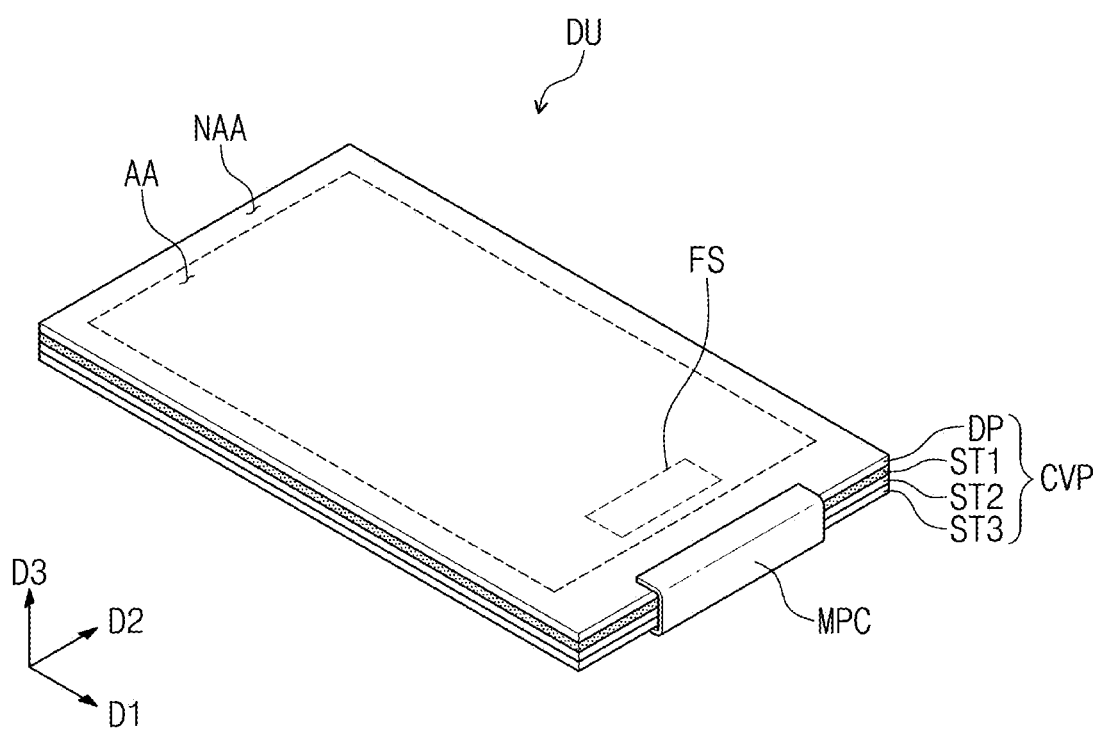
FIG. 3B is a combined perspective view showing some of the components shown in FIG. 3A.
Figure 4:
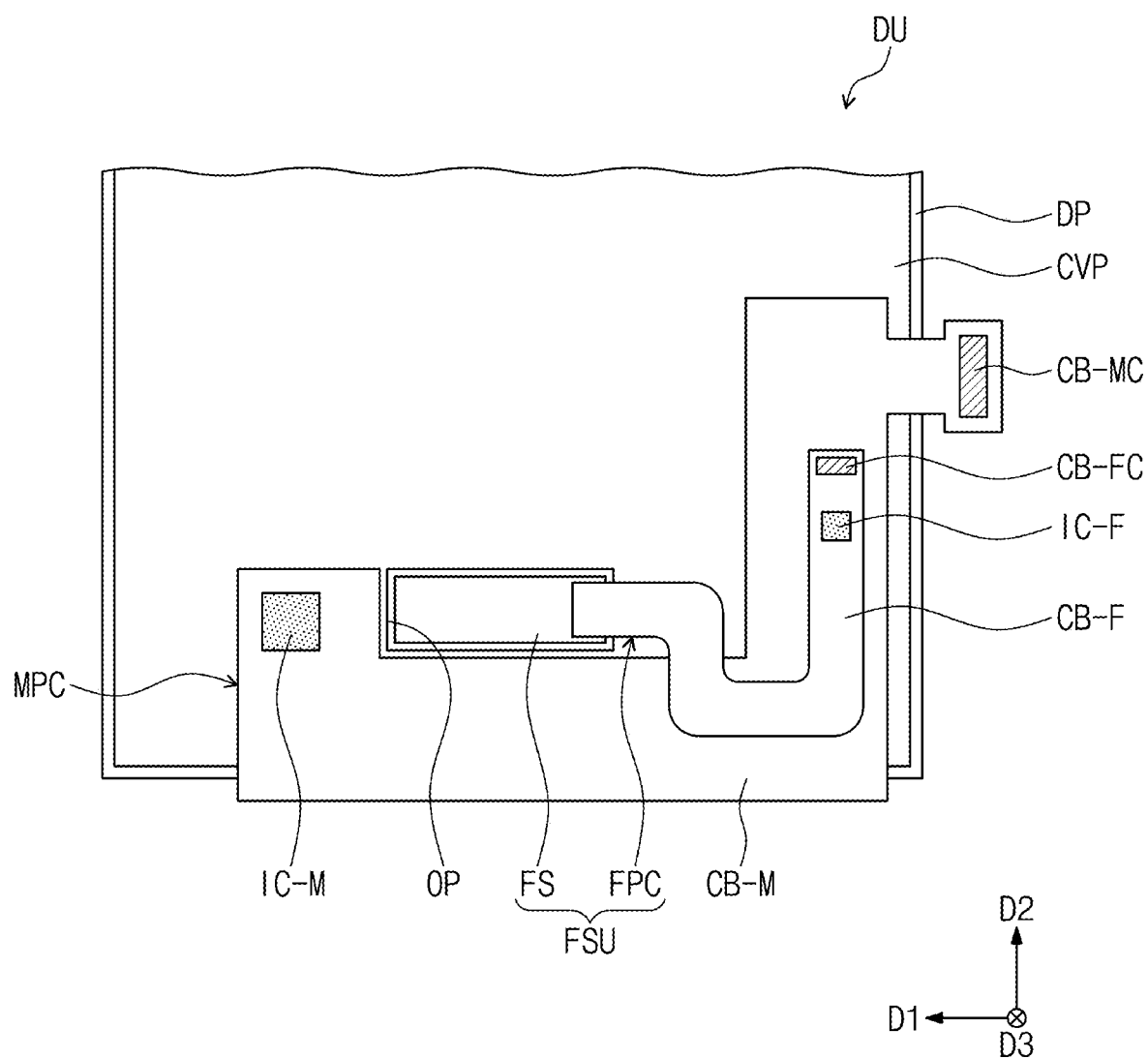
FIG. 4 is a rear view showing a part of a display unit according to some example embodiments.

FIG. 3A is an exploded perspective view showing some of the components shown in FIG. 2. FIG. 3B is a combined perspective view of some of the components shown in FIG. 3A. FIG. 4 is a rear view showing a part of a display unit according to some example embodiments of the inventive concept.

As described above, the window WM includes the display surface IS including the transmission region TA, which is optically transparent, and the bezel region BZA, which is adjacent to the transmission region TA. Because the window WM illustrated in FIG. 3A corresponds to the window WM illustrated in FIG. 1A, some repetitive description thereof may be omitted.

The display unit DU is located on the back surface of the window WM. The display unit DU includes a display panel DP, a main circuit board MPC, a lower panel CVP, and an optical sensor FSU.

The display panel DP includes a front surface DP-U and a back surface DP-B opposite to the front surface DP-U. The front surface DP-U may be a surface facing the window WM. The front surface DP-U may be divided into an active region AA and a peripheral region NAA. The back surface DP-B of the display panel DP according to the inventive concept may be defined as a layer closest to the lower panel CVP among the components of the display panel DP stacked in the third direction D3.

The display panel DP activates the active region AA according to an electrical signal. The display panel DP displays the image IM in the activated active region AA. The transmission region TA may overlap at least the entire active region AA.

The peripheral region NAA is adjacent to the active region AA. The peripheral region NAA may surround the active region AA around the edges thereof. However, this is only illustrative, and the peripheral region NAA may be adjacent only to some of the edges of the active region AA, and is not limited to any one embodiment.

On the peripheral region NAA, various signal lines, electronic devices or the like for providing electrical signals to the active region AA may be arranged. The peripheral region NAA may be covered by the bezel region BZA and thus may not be visually recognized from the outside.

The display panel DP may include a plurality of signal lines GL, DL and PL, a pixel PX, and a plurality of display pads PDD. The signal lines GL, DL and PL may include a gate line GL, a data line DL, and a power line PL. The gate line GL, the data line DL, and the power line PL may each transmit different electrical signals.

The gate line GL extends in the second direction D2. A plurality of the gate lines GL may be provided and arranged to be spaced apart from each other in the first direction D1. In FIG. 3A, for convenience of description, a single gate line GL is shown by way of example.

According to some example embodiments, the display unit DU may further include a gate driving circuit mounted on the display panel DP and providing an electrical signal to the gate line GL. In this case, a gate driving circuit pad that provides an electrical signal to the gate driving circuit may constitute one of the display pads PDD. Alternatively, the display panel DP may further include gate pads for electrically connecting to a gate driving circuit that is externally provided. The gate pads may constitute any one of the display pads PDD.

The data line DL extends in the first direction Dl. The data line DL may be electrically insulated from the gate line GL. A plurality of the data lines GL may be provided and arranged to be spaced apart from each other in the second direction D2. In FIG. 3A, for convenience of description, a single data line DL is illustrated by way of example. The data line DL is connected to the data pad, which constitutes one of the pads PDD. The data line DL provides the pixel PX with the data signal received through the data pad.

The power line PL extends in the second direction D2. The power line PL may be electrically insulated from the gate line GL and the data line DL. A plurality of the power lines GL may be provided and arranged to be spaced apart from each other in the first direction D1. In FIG. 3A, for convenience of description, a single power line PL is shown by way of example. The power line PL may provide a power signal to the pixel PX.

Some of the components included in the pixel PX may be arranged to overlap the active region AA. A plurality of the pixels PX may be provided and connected to corresponding signal wires, respectively. The pixel PX displays light according to an electrical signal to achieve the image IM. In FIG. 3A, for convenience of description, a single pixel PX is illustrated by way of example.

The pixel PX may include a first thin film transistor TR1, a second thin film transistor TR2, a capacitor CP, and a light emitting device EMD. The first thin film transistor TR1, the second thin film transistor TR2, the capacitor CP, and the light emitting device EMD are electrically connected to one another.

The first thin film transistor TR1 may be a switching device that controls turn-on and turn-off of the pixel PX. The first thin film transistor TR1 is connected to the gate line GL and the data line DL. The first thin film transistor TR1 is turned on by the gate signal provided through the gate line GL to provide the capacitor CP with the data signal provided through the data line DL.

The capacitor CP is charged to a voltage corresponding to the potential difference between the first power signal provided from the power line PL and the signal provided from the thin film transistor TR1. The second thin film transistor TR2 provides the light emitting device EMD with the first power signal provided from the power line PL, corresponding to the voltage of the charged capacitor CP.

The light emitting device EMD is arranged in the active region AA. The light emitting device EMD may generate light or control the amount of light according to an electrical signal. Examples of the light emitting device EMD may include an organic light emitting device, a quantum dot light emitting device, an electrophoretic device, or an electrowetting device.

The light emitting device EMD is connected to the power supply voltage to receive a second power signal having a lower level than the power signal provided by the power line PL. A driving current corresponding to a difference between the second power signal and the electrical signal provided from the second thin film transistor TR2 flows through the light emitting device EMD, which makes it possible for the light emitting device EMD to generate light corresponding to the driving current.

However, this is only illustrative, and the pixel PX may include electronic devices having various configurations and arrangements and is not limited to any one embodiment.

The pads PDD are arranged in the peripheral region NAA. The pads PDD may be connected to signal wires, respectively. The pixels PX may be electrically connected to components located outside the display panel DP through the pads PDD. For example, the pads PDD may be connected to pads included in the main circuit board MPC.

The main circuit board MPC may include a main flexible film CB-M and a main driving element IC-M. The main circuit board MPC is connected to the pads PDD. The main circuit board MPC provides an electrical signal to the display panel DP through the pads PDD. The main circuit board MPC may generate a signal for controlling the image IM or a power signal and provide the generated signal to the display panel DP.

According to some example embodiments, the main circuit board MPC may be connected to the front surface DP-U of the display panel DP to be bent toward the back surface DP-B of the display panel DP. The main circuit board MPC may include a main flexible film CB-M and a main driving element IC-M.

The main flexible film CB-M may include a main connector CB-MC, pads, which are not shown, and signal lines. The main flexible film CB-M may be connected to the pads PDD through the pads to be electrically connected to the display panel DP. The main flexible film CB-M may be electrically and physically coupled to the display panel DP through an adhesive member (for example, an anisotropic conductive film), which is not shown. The main connector CB-MC may be bent toward the display panel DP to be electrically connected to the electronic module EM.

The main driving element IC-M may be mounted on the main flexible film CB-M. The main driving element IC-M may be connected to signal lines (not shown) of the main flexible film CB-M to be electrically connected to the display panel DP. The main driving element IC-M generates or processes various electrical signals.

The optical sensor FSU includes a biometric information sensing unit FS and a main circuit board FPC. The biometric information sensing unit FS may sense the fingerprint FNG of the user and transmits the sensed signal to the main circuit board FPC. The biometric information sensing unit FS may be electrically connected to the electronic module EM through the main circuit board FPC.

The lower panel CVP is located on the back surface DP-B of the display panel DP. The lower panel CVP includes a plurality of sheets ST1, ST2, and ST3. The lower panel CVP includes an opening OP in which the biometric information sensing unit FS is mounted. The sheets ST1, ST2, and ST3 may be sequentially stacked in the third direction D3.

The sheets ST1, ST2, and ST3 include respective openings OP1, OP2, and OP3, and the opening OP of the lower panel CVP may be defined by overlapping the openings OP1, OP2, and OP3 included in respective sheets ST1, ST2, and ST3.

The first sheet ST1 may be arranged to be closest to the back surface DP-B of the display panel DP. The first sheet ST1 may be a cushion layer.

The first sheet ST1 may include a first opening OP1 formed through a part of the first sheet ST1 in the third direction D3. The first opening OP1 overlaps the biometric information sensing unit FS.

The first sheet ST1 may be a synthetic resin foam form including a matrix member and a plurality of voids. The matrix member may include a flexible material. For example, the matrix member may include a synthetic resin. The voids may easily absorb an impact applied to the display panel DP. The voids may be defined as the first sheet ST1 has a porous structure. Therefore, the voids may be dispersed in the matrix member. The voids may cause the shape of the first sheet ST1 to be easily deformed. Accordingly, the elasticity of the first sheet ST1 is improved, and thus the impact resistance of the lower panel CVP is improved.

The second sheet ST2 is located between the first sheet ST1 and the third sheet ST3. The second sheet ST2 may be a heat radiation layer having a heat radiation function.

The second sheet ST2 may include a second opening OP2 formed by penetrating a portion of the second sheet ST2 in the third direction D3. The second opening OP2 overlaps the biometric information sensing unit FS.

The second sheet ST2 may be a sheet including a metal material having high thermal conductivity such as copper or aluminum.

The third sheet ST3 is located on the second sheet ST2. The second sheet ST2 may be a light shielding layer having a light shielding function.

The third sheet ST3 may include a third opening OP3 formed by penetrating a portion of the third sheet ST3 in the third direction D3. The third opening OP3 overlaps the biometric information sensing unit FS.

The third sheet ST3 may block the back surface DP-B of the display panel DP from being shown through and thus prevent the components located on the back surface of the display panel DP from being visually recognized or perceived by viewers. However, this is only illustrative, and the third sheet ST3 may be a light shielding layer formed directly on the back surface DP-B of the display panel DP. In this case, the third sheet ST3 may be formed by coating a material such as carbon or chromium on the back surface DP-B of the display panel DP, and a separate adhesive layer may be omitted.

According to some example embodiments, adhesive layers may be located between the plurality of sheets ST1, ST2, and ST3. The adhesive layers may include at least one of an optical clear resin (OCR), an optical clear adhesive (OCA), or a pressure sensitive adhesive (PSA). In addition, the adhesive layers may be provided in the form of a double-sided tape, and are not limited to any embodiment.

Figure 5:
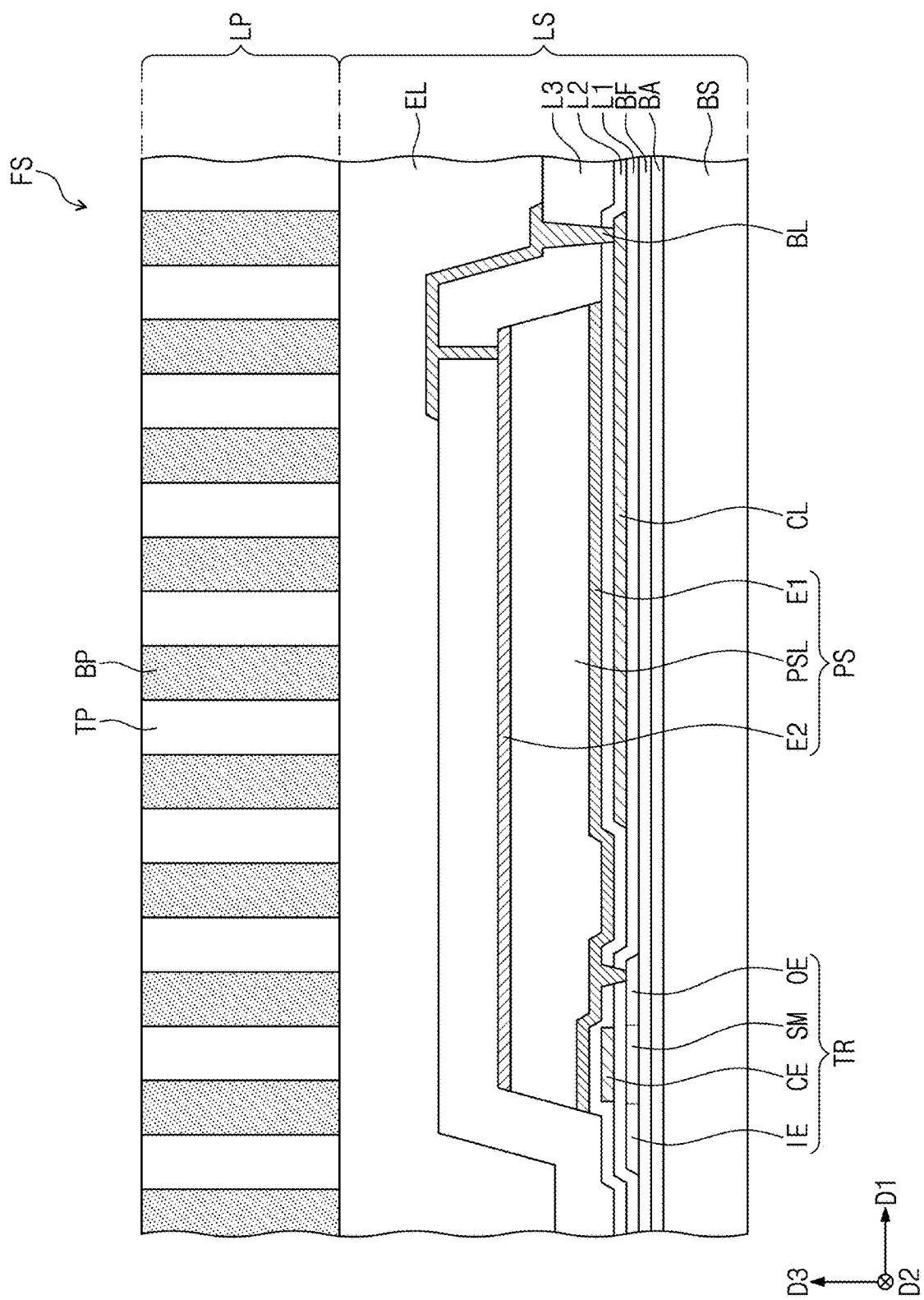
FIG. 5 is a sectional view of an optical sensor according to some example embodiments.
Figure 6A:
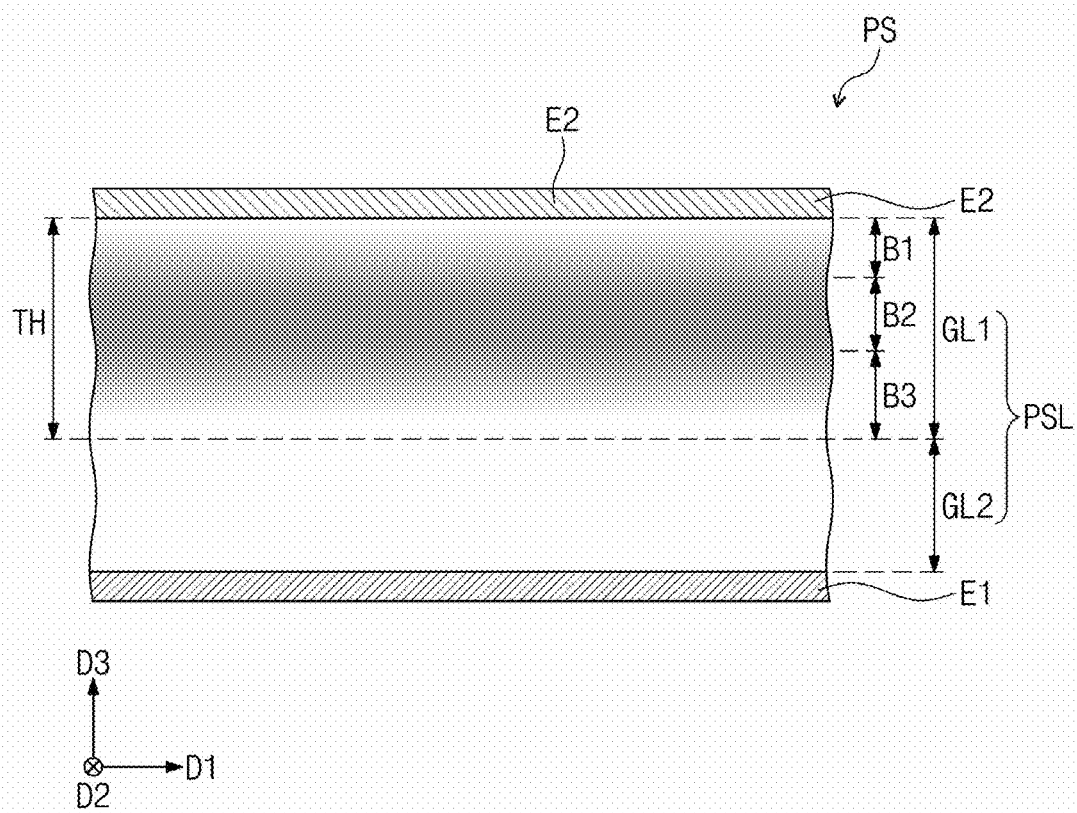
FIG. 6A is a sectional view of a sensing unit according to some example embodiments.
Figure 6B:
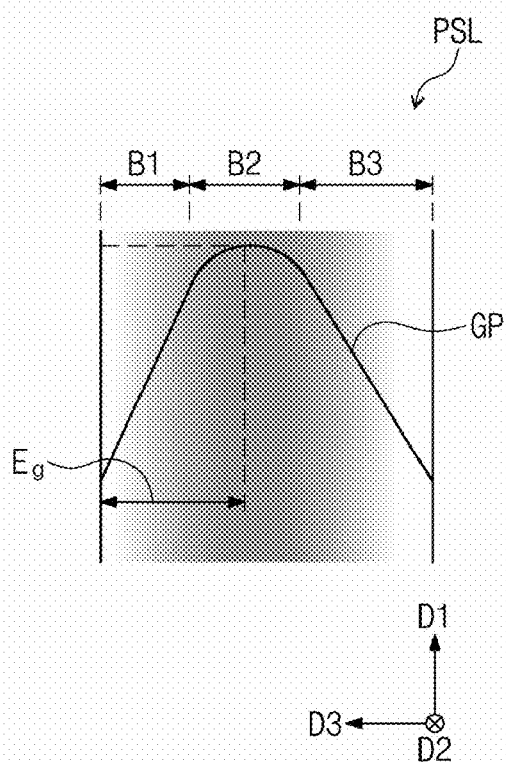
FIG. 6B is a graph showing the concentration of germanium (Ge) ions in each region of a sensing layer according to some example embodiments.
Figure 7:
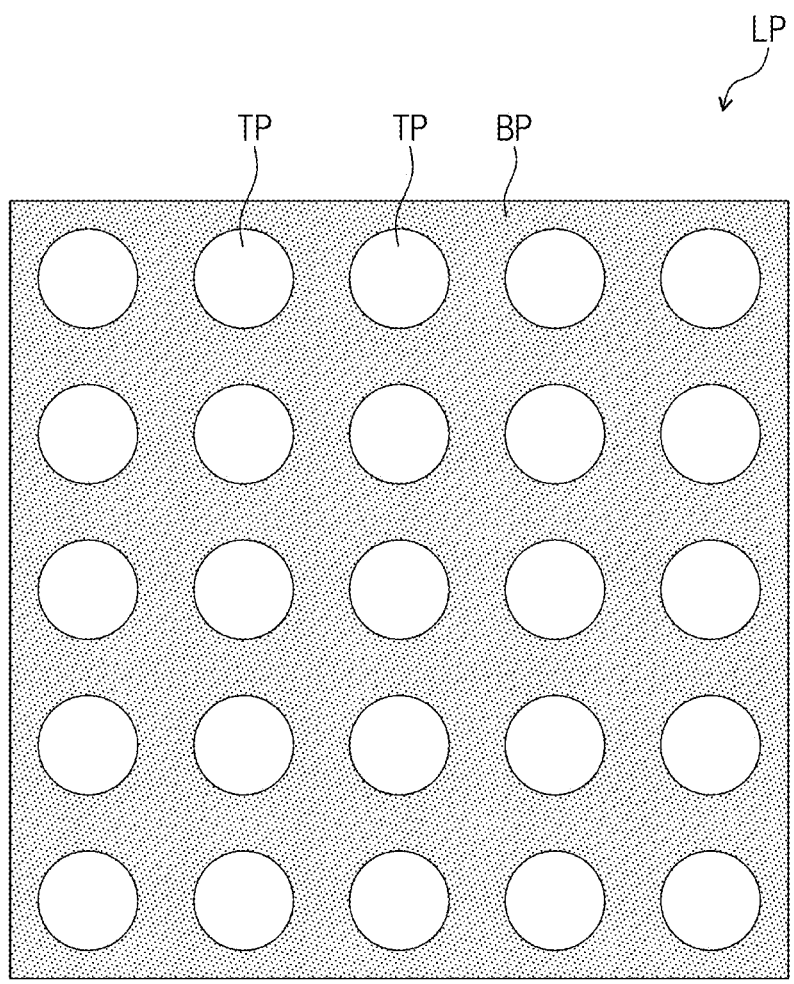
FIG. 7 is a plan view of an optical pattern unit according to some example embodiments.

FIG. 5 is a sectional view of an optical sensor according to some example embodiments of the inventive concept. FIG. 6A is a sectional view of a sensing unit according to some example embodiments of the inventive concept. FIG. 6B is a graph showing the concentration of Ge ions in each region of a sensing layer according to some example embodiments of the inventive concept. FIG. 7 is a plan view of an optical pattern unit according to some example embodiments of the inventive concept.

Referring to FIG. 5, the biometric information sensing unit FS of the optical sensor FSU includes a sensing unit LS and an optical pattern unit LP. The optical pattern unit LP is arranged on the sensing unit LS.

The sensing unit LS may include a base layer BS, a transistor TR, a sensing element PS, and a plurality of insulating layers BA, BF, L1, L2, L3, and EL. In addition, the sensing unit LS may include a wiring electrode CL and a connection electrode BL.

The base layer BS may include a synthetic resin film. The synthetic resin layer may include a thermosetting resin. Particularly, the synthetic resin layer may be a polyimide resin layer, and the material thereof is not particularly limited. The synthetic resin layer may include at least one of an acrylic resin, a methacrylic resin, polyisoprene, a vinyl resin, an epoxy resin, a urethane resin, a cellulose resin, a siloxane resin, a polyamide resin, or a perylene resin. In addition, the base layer BS may include a glass substrate, a metal substrate, or an organic or inorganic composite substrate.

The barrier layer BA may be arranged on the base layer BS. The barrier layer BA prevents foreign matter from being introduced from the outside. The barrier layer BA may include at least one of a silicon oxide layer or a silicon nitride layer. Each of the layers may be provided in plurality, and the silicon oxide layer and the silicon nitride layer may be alternately stacked.

The buffer layer BF may be arranged on the barrier layer BA. The buffer layer BF improves the bonding force between the base layer BS and the semiconductor pattern and/or the conductive pattern. The buffer layer BF may include at least one of a silicon oxide layer or a silicon nitride layer. The silicon oxide layer and the silicon nitride layer may be alternately stacked.

The transistor TR may be arranged on the buffer layer BF. The transistor TR may include a semiconductor pattern SM, an input electrode IE, an output electrode OE, and a control electrode CE. The semiconductor pattern SM, the input electrode IE, and the output electrode OE may be arranged on the buffer layer BF.

The first insulating layer L1 is located or formed on the buffer layer BF and covers the semiconductor pattern SM, the input electrode IE, and the output electrode OE. The first insulating layer L1 may be an inorganic layer and/or an organic layer, and may have a single-layer structure or a multilayer structure. According to some example embodiments, the first insulating layer L1 may be a single layer of silicon oxide.

The control electrode CE and the wiring electrode CL may be located on the first insulating layer L1. The wiring electrode CL may be provided with a voltage (e.g., a set or predetermined voltage), for example, a bias voltage. The wiring electrode CL may be electrically connected to a sensing element PS to be described later.

The second insulating layer L2 may be located on the first insulating layer L1 and may cover the control electrode CE and the wiring electrode CL. The second insulating layer L2 may be an inorganic layer and may have a single-layer structure or a multilayer structure. According to some example embodiments, the second insulating layer L2 may be a single layer of silicon oxide.

The sensing element PS may be located on the second insulating layer L2. The sensing element PS may be electrically connected to the transistor TR and the wiring electrode CL. For example, the operation of the sensing element PS may be controlled by a signal provided from the transistor TR and may receive a voltage (e.g., a set or predetermined voltage) from the wiring electrode CL.

The sensing element (pin-diode) PS may include a first sensing electrode (N-type semiconductor layer) E1, a sensing layer (intrinsic semiconductor layer) PSL, and a second sensing electrode (P-type semiconductor layer) E2.

The first sensing electrode E1 may be electrically connected to the transistor TR through the first and second insulating layers L1 and L2. The first sensing electrode E1 may include any one of phosphorus (P) ion-containing amorphous silicon or molybdenum (Mo).

The sensing layer PSL may be located on the first sensing electrode E1. The sensing layer PSL according to some example embodiments of the inventive concept may include amorphous silicon impregnated with Ge ions.

The second sensing electrode E2 may be located on the sensing layer PSL. The second sensing electrode E2 may include nitrogen (N) ion-containing amorphous silicon or indium tin oxide (ITO).

The third insulating layer L3 may be located on the second sensing electrode E2. The third insulating layer L3 may be an inorganic layer and may have a single-layer structure or a multilayer structure. For example, the third insulating layer L3 may include a silicon oxide layer and a silicon nitride layer.

The connection electrode BL may be located on the third insulating layer L3. The connection electrode BL may be electrically connected to the second sensing electrode E2 through the third insulating layer L3. In addition, the connection electrode BL may be electrically connected to the wiring electrode CL through the second and third insulating layers L2 and L3.

The fourth insulating layer EL may be located on the third insulating layer L3 and cover the connection electrode BL. The fourth insulating layer EL may be an organic layer and may have a single-layer structure or a multilayer structure. For example, the fourth insulating layer EL may be a single layer of polyimide resin.

The optical pattern unit LP may be directly located on the sensing unit LS. For example, the optical pattern unit LP may be directly arranged on a fourth insulating layer EL. That is, forming of the optical pattern unit LP and the sensing unit LS may be performed through a continuous process, but embodiments according to the present disclosure are not limited thereto. Thus, the optical pattern unit LP may be combined with the sensing unit LS through a separate adhesive layer, and embodiments according to the present disclosure are not limited to any one embodiment.

The optical pattern unit LP may include a plurality of transmission patterns TP (hereinafter, referred to as transmission patterns) and a light shielding pattern BP. The transmission patterns TP may have optical transparency, and the light shielding pattern BP may have a property of absorbing light. Light reflected from the fingerprint FNG of the user may pass through the transmission patterns TP and be incident onto the sensing element PS.

Referring to FIG. 6A and FIG. 6B, the sensing element PS according to some example embodiments of the inventive concept may include a sensing layer PSL including a plurality of regions GL1 and GL2. The sensing layer PSL according to some example embodiments of the inventive concept may include amorphous silicon impregnated with Ge ions. The Ge ions may be implanted into the sensing layer PSL through an ion implantation method. Therefore, the concentration of the Ge ions in the sensing layer PSL may vary.

The regions GL1 and GL2 of the sensing layer PSL may include an impregnation region GL1, which is impregnated with Ge ions, and a non-impregnation region GL2, which is not impregnated with Ge ions.

The impregnation region GL1 according to the inventive concept may include a first region B1, a second region B2, and a third region B3, which are sequentially arranged. The first region B1 may be closest to the second sensing electrode E2. The third region B3 may be closest to the non-impregnation region GL2, and the second region B2 may be located between the first region B1 and the third region B3.

The concentration of the Ge ions in amorphous silicon forming the sensing layer PSL according to the inventive concept may be relatively higher in the second region B2 than in the first region B1 and the third region B3.

The Ge ions included in the sensing layer PSL are implanted into amorphous silicon by the ion implantation method. In this case, the concentration of the Ge ions may be varied for each region of the sensing layer PSL due to the difference in speed at which the Ge ions are implanted as ion beams.

For example, in the first region B1, a relatively low concentration of Ge ions may be included compared to that in the second region B2 due to the initial speed at which the ion beams of Ge ions are implanted. In addition, the ion beams of the Ge ions passing through the second region B2 may be stopped in the third region B3 due to a decrease in the implantation speed.

According to some example embodiments, the first region B1 may have a band-gap energy which is relatively lower than those of the second region B2 and the third region B3. The band-gap energy of amorphous silicon is 1.7 eV, and the band-gap energy of the Ge ions is 0.67 eV. Thus, in the amorphous silicon forming the sensing layer PSL, the region having a higher Ge ion concentration has a lower band-gap energy.

Therefore, the first region B1 having a high band-gap energy may absorb light of a relatively shorter wavelength band than the second region B2 and the third region B3. The light, which has transmitted through the first region B1 and in which photon energy decreases as the light has a longer wavelength band, passes through the second region B2. In this case, because the second region B2 having the highest concentration of the Ge ions has a low band-gap energy, even the light of the long wavelength band may effectively generate an electron-hole pair (EHP).

According to some example embodiments, light sensing efficiency may be increased by including regions having different concentrations of the Ge ions implanted into the sensing layer PSL. Accordingly, an electronic apparatus ED (see FIG. 1A) having improved reliability may be provided.

In FIG. 6B, the concentration of the Ge ions in each region of the sensing layer PSL is shown as a graph GP. The concentration of the Ge ions implanted into the sensing layer PSL increase gradually from the first region B1 to the second region B2 and may be maximized in the second region B2. The concentration of the Ge ions implanted into the sensing layer PSL may gradually decrease from the second region B2 to the third region B3. Therefore, the concentration of the Ge ions in the first region B1 to the third region B3 may have a Gaussian distribution. In an embodiment of the inventive concept, the Gaussian distribution does not have perfect symmetry between the concentrations of the Ge ions in the first region B1 and the third region B3 with respect to the maximum point of the second region B2, and the concentrations of the Ge ions in the first region B1 and the third region B3 may have different distributions from each other with respect to the maximum point of the second region B2.

As described above, the band-gap energy in the sensing layer PSL may gradually decrease from the first region B1 to the maximum concentration point of the Ge ions in the second region B2.

According to some example embodiments, the sum of the thicknesses of the first region B1 to the third region B3 in the third direction D3, that is, the thickness of the impregnation region GL1 may be about 10 Å to about 9,000 Å.

When a thickness TH of the sensing layer PSL is less than 10 Å, the thickness of the area occupied by the first region B1 of the sensing layer PSL may be reduced and thus light of a short wavelength band may not be absorbed, which may lead to optical loss. When the thickness TH of the sensing layer PSL is greater than 9,000 Å, the light sensing efficiency may be reduced as the thickness of a region having low band-gap energy in the sensing layer PSL excessively increases.

According to some example embodiments, the thickness of the sensing layer PSL in the third direction D3, that is, the sum of thicknesses of the impregnation region GL1 and the non-impregnation region GL2 may be about 10,000 Å or less.

Referring to FIG. 7, according to some example embodiments, the optical pattern unit LP may include the plurality of transmission patterns TP and the light shielding pattern BP surrounding the transmission patterns TP.

The transmission patterns TP may be arranged to be spaced apart from each other on the plane in the first direction D1 and the second direction D2, and may be surrounded by the light shielding pattern BP. For example, the transmission patterns TP may be arranged in a matrix form.

Each of the transmission patterns TP may have a circular shape. The shapes of the transmission patterns TP are not limited thereto, and each of the transmission patterns TP may be modified into various shapes such as an ellipse and a polygon.

Figure 8A:
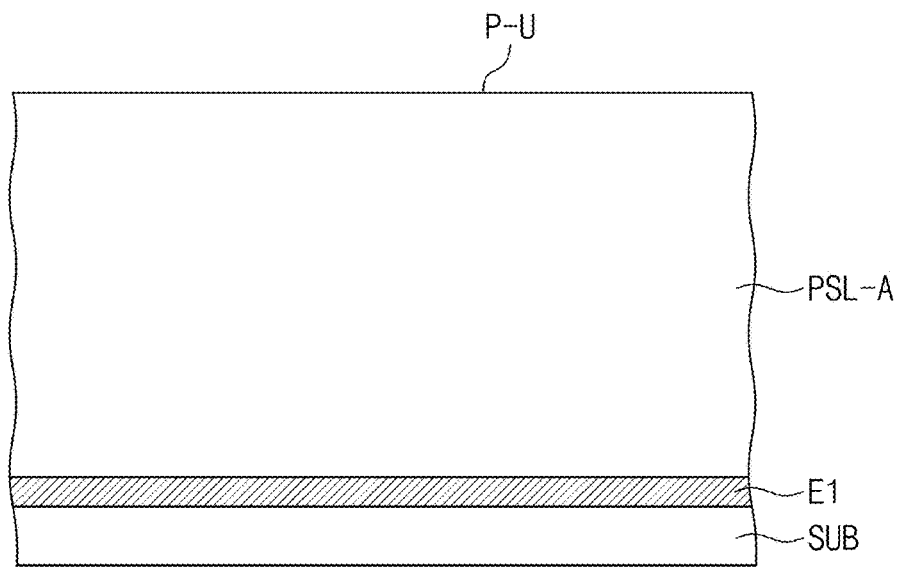
Figure 8B:
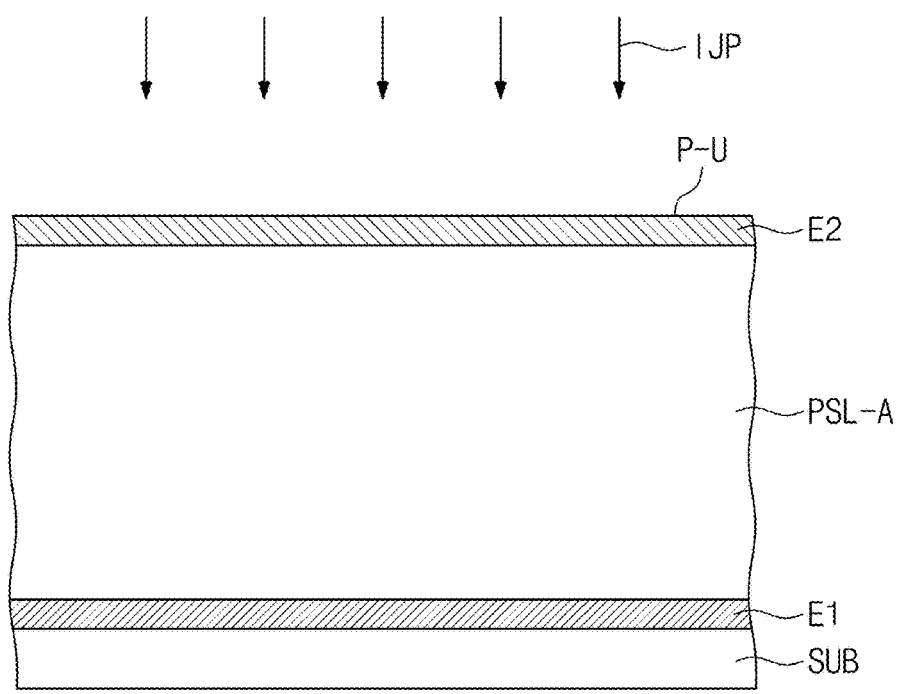
Figure 9A:
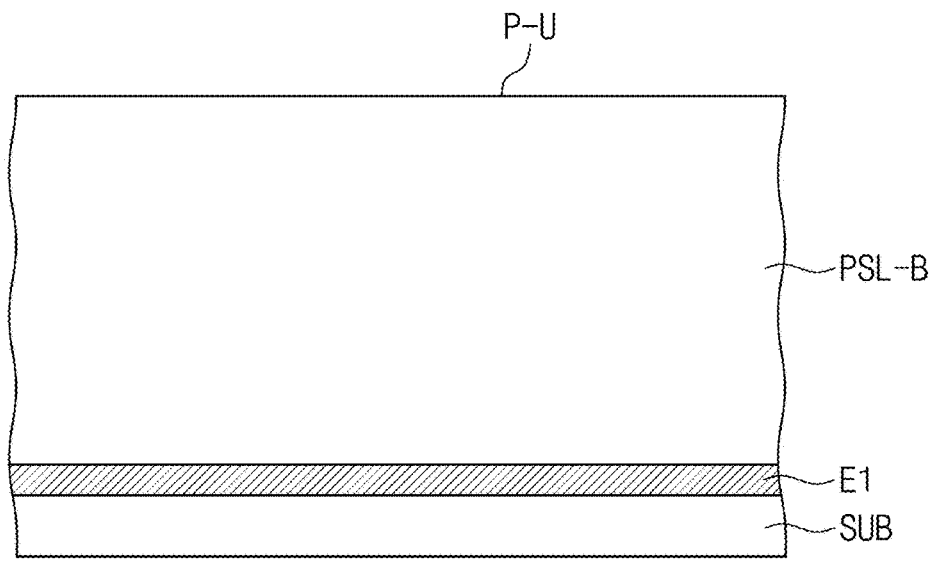
Figure 9B:
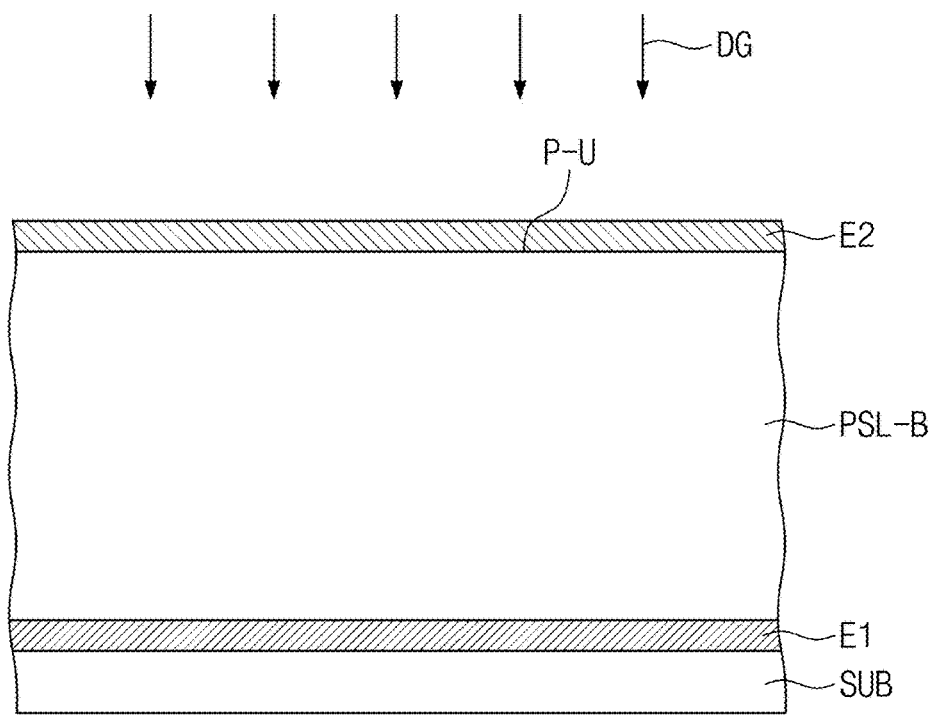

FIG. 8A to 8C are sectional views illustrating a method of manufacturing an electronic apparatus according to some example embodiments of the inventive concept. FIG. 9A to 9C are sectional views illustrating a method of manufacturing an electronic apparatus according to some example embodiments of the inventive concept. The same or similar reference numerals are used for the same or similar components as in FIGS. 1A to 7, and descriptions thereof will not be repeated. Hereinafter, methods of manufacturing an electronic apparatus will be described in different embodiments with reference to FIGS. 8A to 8C and 9A to 9C.

Referring to FIG. 8A, a method includes providing an initial sensing layer PSL-A. According to some example embodiments, the initial sensing layer PSL-A may be defined as a layer in a state before Ge ions are implanted into the sensing layer PSL of FIG. 6A.

The initial sensing layer PSL-A may be formed on a first sensing electrode E1. The first sensing electrode E1 may be formed on a work substrate SUB, and may form nitrogen (N) ion-containing amorphous silicon through a deposition process.

The surface of the initial sensing layer PSL-A opposite to the surface that contacts the first sensing electrode E1 may be defined as an upper surface P-U.

Then, referring to FIG. 8B, the method may include forming a second sensing electrode.

According to some example embodiments, the second sensing electrode E2 may be formed in the initial sensing layer PSL-A. That is, the second sensing electrode E2 may be formed by implanting phosphorous (P) ion-containing amorphous silicon onto the upper surface P-U of the initial sensing layer PSL-A through the ion implantation method (IJP).

Therefore, the second sensing electrode E2 according to some example embodiments may be formed in the initial sensing layer PSL-A.

Then, referring to FIG. 8C, the method includes forming a sensing layer.

The sensing layer PSL may be formed by implanting Ge ions onto an upper surface of the second sensing electrode E2 through an ion implantation method (IJG). In this case, ion beams penetrate the second sensing electrode E2 and are implanted into the initial sensing layer PSL-A, and the concentration of the Ge ions implanted into the initial sensing layer PSL-A may vary in the direction from the second sensing electrode E2 toward the first sensing electrode E1.

The thickness TH of the implanted Ge ions in the sensing layer PSL may be about 10 Å to about 9,000 Å. As the second sensing electrode E2 included in a sensing element PS-A according to some example embodiments is formed in the initial sensing layer PSL-A through the ion implantation method (IJP), a base point TS-A of the thickness TH of the implanted Ge ions may be defined in the sensing layer PSL.

Referring to FIG. 9A, the method includes providing an initial sensing layer PSL-B. According to some example embodiments, the initial sensing layer PSL-B may be defined as a layer in a state before Ge ions are implanted into the sensing layer PSL of FIG. 6A.

The initial sensing layer PSL-B may be formed on a first sensing electrode E1. The first sensing electrode E1 may be formed on a work substrate SUB, and may form nitrogen (N) ion-containing amorphous silicon through a deposition process.

The surface of the initial sensing layer PSL-B opposite to the surface that contacts the first sensing electrode E1 may be defined as the upper surface P-U.

Then, referring to FIG. 9B, the method may include forming a second sensing electrode.

According to some example embodiments, the second sensing electrode E2 may be formed on the upper surface P-U of the initial sensing layer PSL-B. That is, the second sensing electrode E2 may be formed by applying phosphorous (P) ion-containing amorphous silicon on the upper surface P-U of the initial sensing layer PSL-B through a deposition process DG.

Therefore, the second sensing electrode E2 according to some example embodiments may be formed on the upper surface P-U of the initial sensing layer PSL-B.

Then, referring to FIG. 9C, the method may include forming a sensing layer.

The sensing layer PSL may be formed by implanting Ge ions onto an upper surface of the second sensing electrode E2 through an ion implantation method (IJG). In this case, ion beams penetrate the second sensing electrode E2 and are implanted into the initial sensing layer PSL-B, and the concentration of the Ge ions implanted into the initial sensing layer PSL-B may vary in the direction from the second sensing electrode E2 toward the first sensing electrode E1.

The thickness TH of the implanted Ge ions in the sensing layer PSL may be about 10 Å to about 9,000 Å. As the second sensing electrode E2 included in a sensing element PS-B according to some example embodiments is formed on the upper surface P-U of the initial sensing layer PSL-B through the deposition process DG, a base point TS-B of the thickness TH of the implanted Ge ions may be defined on the upper surface P-U of the sensing layer PSL.

According to some example embodiments of the inventive concept, the light sensing efficiency may be increased by including regions having different concentrations of the Ge ions implanted in the sensing layer. Therefore, an electronic apparatus having relatively improved reliability may be provided.

Although aspects of some example embodiments of the present invention have been described, it is understood that embodiments according to the present invention should not be limited to these example embodiments but various changes and modifications can be made by one ordinary skilled in the art within the spirit and scope of the present invention as hereinafter claimed.

Therefore, the technical scope of the present invention should not be limited to the contents described in the detailed description in the specification but should be defined by the claims and their equivalents.

What is claimed is:

1. An optical sensor comprising:
    a sensing unit including a first sensing electrode, a second sensing electrode spaced apart from the first sensing electrode, and a sensing layer between the first sensing electrode and the second sensing electrode, the sensing layer containing amorphous silicon and germanium (Ge) ions impregnated in the amorphous silicon; and
    an optical pattern unit on the sensing unit and including a light shielding pattern and a plurality of transmission patterns in the light shielding pattern, wherein
    the sensing layer includes a first region, a second region, and a third region sequentially arranged from a boundary between the second sensing electrode and the sensing layer toward the first electrode, and
    a concentration of the germanium (Ge) ions in the amorphous silicon is relatively higher in the second region than in the first region and the third region.

2. The optical sensor of claim 1, wherein a thickness from the first region to the third region is in a range of 10 Å to 9,000 Å.

3. The optical sensor of claim 2, wherein
    the sensing layer includes an impregnation region including the first to third regions and a non-impregnation region adjacent to the impregnation region and not impregnated with germanium (Ge) ions, and a sum of thicknesses of the impregnation region and the non-impregnation region is 10,000 Å or less.

4. The optical sensor of claim 1, wherein the second region has a relatively lower band-gap energy than the first region and the third region.

5. The optical sensor of claim 1, wherein the first region absorbs light of a relatively shorter wavelength band than the second region and the third region.

6. The optical sensor of claim 1, wherein the concentration of the germanium (Ge) ions has a Gaussian distribution in the first to third regions.

7. The optical sensor of claim 1, wherein the transmission patterns are spaced apart from each other on a plane in a direction crossing each other and are surrounded by the light shielding pattern.

8. The optical sensor of claim 1, wherein the first sensing electrode and the second sensing electrode include amorphous silicon.

9. An electronic apparatus comprising:
a display panel including an active region and a peripheral region adjacent to the active region; and
an optical sensor on a back surface of the display panel and overlapping the active region, wherein
the optical sensor includes a sensing layer including a first sensing electrode, a second sensing electrode spaced apart from the first sensing electrode, wherein the sensing layer is between the first sensing electrode and the second sensing electrode and contains amorphous silicon and germanium (Ge) ions impregnated in the amorphous silicon, and
a concentration of the germanium (Ge) ions in the amorphous silicon varies from the second sensing electrode to the first electrode.

10. The electronic apparatus of claim 9, wherein
the sensing layer includes a first region, a second region, and a third region sequentially arranged from a boundary between the second sensing electrode and the sensing layer toward the first electrode, and
the concentration of the germanium (Ge) ions in the amorphous silicon is higher in the second region than in the first region and the third region.

11. The electronic apparatus of claim 10, wherein a thickness from the first region to the third region is in a range of 10 Å to 9,000 Å.

12. The electronic apparatus of claim 11, wherein
the sensing layer includes an impregnation region including the first to third regions and a non-impregnation region adjacent to the impregnation region that is not impregnated with germanium (Ge) ions, and
a sum of thicknesses of the impregnation region and the non-impregnation region is 10,000 Å or less.

13. The electronic apparatus of claim 10, wherein the second region has a relatively lower band-gap energy than the first region and the third region.

14. The electronic apparatus of claim 10, wherein the first region absorbs light of a relatively shorter wavelength band than the second region and the third region.

15. The electronic apparatus of claim 9, wherein the first sensing electrode and the second sensing electrode include amorphous silicon.

16. The electronic apparatus of claim 9, wherein the optical sensor further includes an optical pattern unit on the second sensing electrode and including a light shielding pattern and a plurality of transmission patterns in the light shielding pattern.

17. The electronic apparatus of claim 9, further comprising
a lower panel between the display panel and the optical sensor and having an opening accommodating the optical sensor, wherein
the lower panel includes any one of a cushion layer, a heat dissipation layer or a light shielding layer.

\* \* \* \* \*